UNITED STATES PATENT OFFICE.

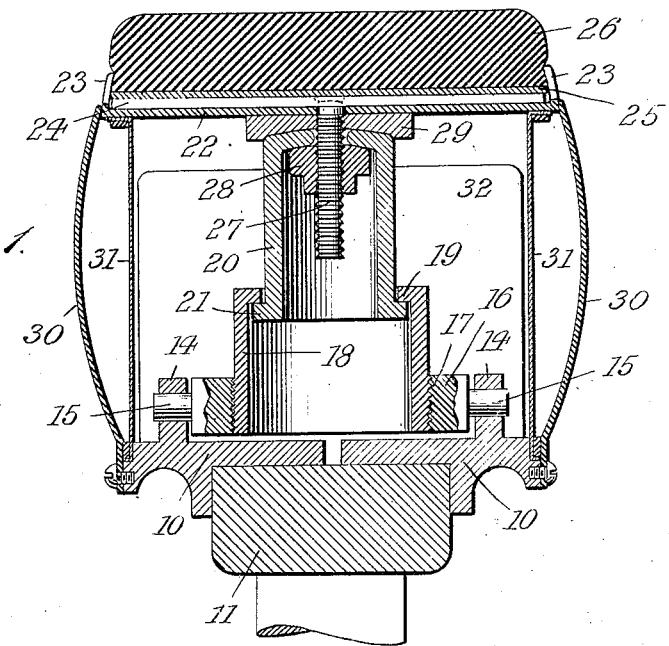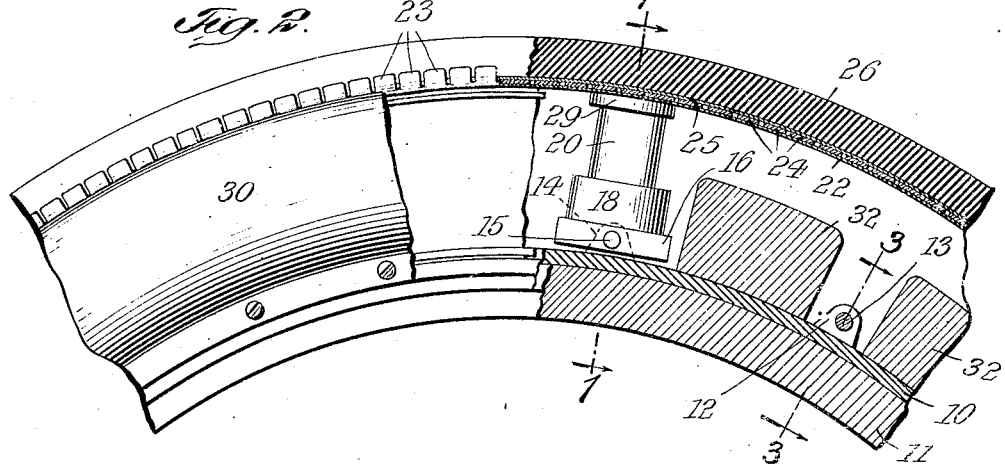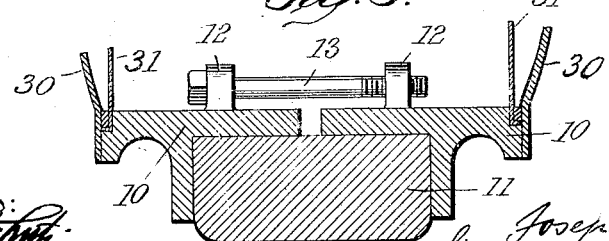

JOSEPH GAYNOR, OF NEW YORK, N. Y.

RESILIENT TIRE.

1,114,600.  Specification of Letters Patent.  Patented Oct. 20, 1914.

Application filed October 3, 1913. Serial No. 793,100.

*To all whom it may concern:*

Be it known that I, JOSEPH GAYNOR, a citizen of the United States, residing at New York city, county and State of New York, have invented new and useful Improvements in Resilient Tires, of which the following is a specification.

This invention relates to a resilient tire of novel construction, which is durable, possesses an effective spring action and may be readily fitted to a wheel of conventional construction.

In the accompanying drawing: Figure 1 is a cross section of a tire embodying my invention, on line 1, 1, Fig. 2. Fig. 2 is a longitudinal section partly in side view of part of the tire, and Fig. 3 a cross section on line 3—3, Fig. 2.

The wheel rim is composed of a pair of flanged rings 10, adapted to straddle opposite sides of the felly 11. Rings 10, are provided with a number of radially extending apertured lugs 12, the lugs of one ring being tapped for the reception of screw bolts 13, by means of which the rings may be tightly drawn together, so as to become firmly seated upon the wheel. In addition to lugs 12, rings 10 are provided with apertured lugs 14, that constitute bearings for the gudgeons 15 of oscillative plate 16 having central openings 17 into which are tapped the lower threaded ends of cylinders 18. These cylinders have flanged outer ends 19 and are adapted to receive hollow cup-shaped plungers 20, having correspondingly flanged inner ends 21.

The several plungers 20 are encompassed by, and are secured to, a common resilient steel band 22, arranged concentrically to felly 11, and made of a strength that corresponds to the load to be carried by the tire. Band 22 is provided along its edges with radially slitted outwardly extending flanges 23. Between the latter is confined a plurality of metal strips 24 that are loosely placed upon band 22 in a transverse direction, said strips being held in position by an outer endless binder 25 stretched tightly around the strips. Binder 25 is in turn encircled by a rubber or other resilient shoe 26 which is also held in position by flanges 23. Those strips 24 that are located opposite the plungers 20, are each provided with an inwardly extending screw bolt 27 that passes through a corresponding aperture of band 22 and of the plunger head. The strips 24 serve to reinforce band 22, and also to carry the bolts 27, so that the band is not by them unduly strained. Bolt 27 carries a nut 28 within the plunger by means of which the plunger is securely attached to the band. Between the band and the plunger there is interposed a pillow 29, which is dished to conform to the bulged shape of the plunger, and constitutes a bearing for the same. At the sides, the tire is closed by means of a pair of convex annular plates or cheeks 30, which are at their inner ends fastened to the rings 10, while their outer ends slidably overlie the flanges 23. In addition to the cheeks 30, the tire is provided with a pair of canvas or similar foldable sheets 31 attached to and stretched between the rings 10 and band 22. A number of bolsters 32 mounted upon the rings 10, limit the inward displacement of the band 22 and consequently of the shoe 26 under load pressure.

It will be seen that my improved tire lacks any springs or other cushioning members excepting the resilient band 22, the parts 16, 18, 20 merely serving for yieldingly holding the band and shoe to the wheel rim and for transmitting the propelling power from the rim to said shoe. That portion of the shoe which is in temporary contact with the road bed becomes flattened to an extent which depends upon the load while the remainder of the tire is correspondingly expanded, both of these deformations taking place against the inherent resiliency of band 22. The flattening of the latter will cause plungers 20 to be moved inward within cylinders 18, while the remaining expanded band section, will become raised into a position slightly eccentric to the wheel rim, which relative movement between tire and band is rendered possible by the pivotal connection between plates 16 and rings 10.

I claim:

1. A tire comprising a tread, a continuous apertured resilient band extending along the inner face thereof, a plurality of transverse strips interposed between the tread and band, bolts secured to the strips and extending inwardly through the band-apertures, flanged plungers carried by the bolts, annular plates pivoted to the wheel rim, and flanged cylinders tapped into said plates and adapted to be engaged by the plungers.

2. A tire comprising a tread, a continuous apertured resilient band extending along the inner face of the tread, a plurality of transverse strips interposed between tread and band, a plurality of bolts secured to the strips and extending inwardly through the band-apertures, a plurality of flanged plungers carried by the bolts, a plurality of annular plates pivoted to the wheel rim, and a plurality of flanged cylinders tapped into the annular plates and adapted to be engaged by the plungers.

JOSEPH GAYNOR.

Witnesses:
FRANK V. BRIESEN,
ARTHUR E. ZUMPE.

Copies of this patent may be obtained for five cents each, by addressing the "Commissioner of Patents, Washington, D. C."